United States Patent [19]
F'Geppert

[11] 3,912,288
[45] Oct. 14, 1975

[54] VEHICLE LEVEL CONTROL
[75] Inventor: Erwin F'Geppert, Novi, Mich.
[73] Assignee: The United States of America as represented by the Secretary of the Army, Washington, D.C.
[22] Filed: Aug. 21, 1974
[21] Appl. No.: 499,258

[52] U.S. Cl. ............... 280/6 H; 254/86 H; 200/188
[51] Int. Cl.² .............................................. B60S 9/10
[58] Field of Search........... 280/6 R, 6 H, 6.1, 6.11; 254/86 R, 86 H; 200/188, 212

[56] References Cited
UNITED STATES PATENTS

| | | | |
|---|---|---|---|
| 1,871,177 | 8/1932 | Held | 200/188 |
| 2,202,009 | 5/1940 | Knox | 280/6.1 |
| 3,404,898 | 10/1968 | Vogel | 280/6 |
| 3,404,899 | 10/1968 | Vogel | 280/6 |
| 3,528,671 | 9/1970 | Hausenblas | 280/6 |
| 3,669,409 | 6/1972 | Eranosian | 280/6.1 |
| 3,834,731 | 9/1974 | Vehara | 280/150.5 |

Primary Examiner—Philip Goodman
Assistant Examiner—John A. Carroll
Attorney, Agent, or Firm—Peter A. Taucher; John E. McRae; Robert P. Gibson

[57] ABSTRACT

Disclosed is a control device responsive to various tilted conditions of a motionless vehicle to restore the vehicle to a level attitude. The control device selectively energizes jacks carried at the corners of the vehicle to raise the lowest corners, thereby causing the vehicle to assume a level condition. The control device is useful in such vehicles as mobile homes, flat bed trailers, and mobile missile launcher platforms.

1 Claim, 5 Drawing Figures

U.S. Patent  Oct. 14, 1975  3,912,288
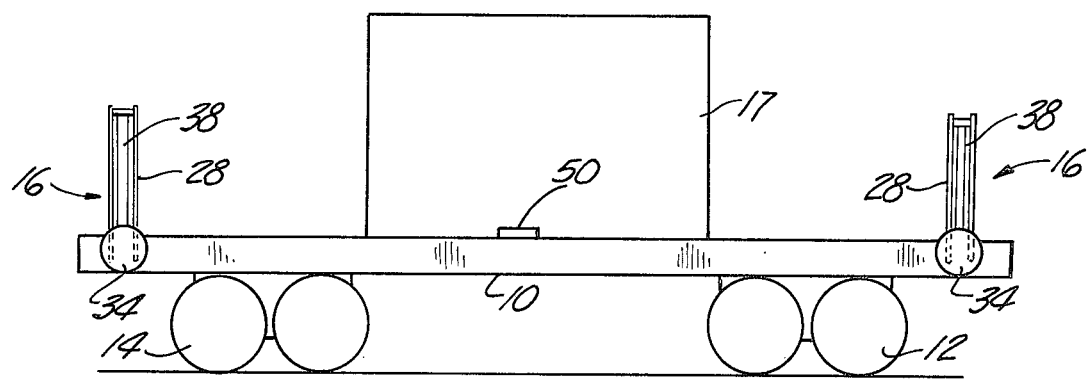
Fig-1
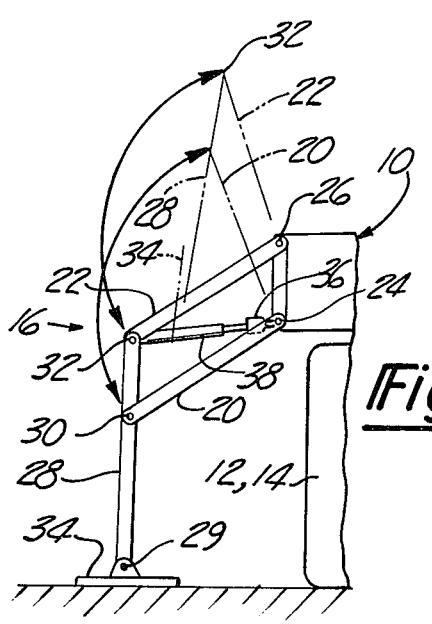
Fig-2
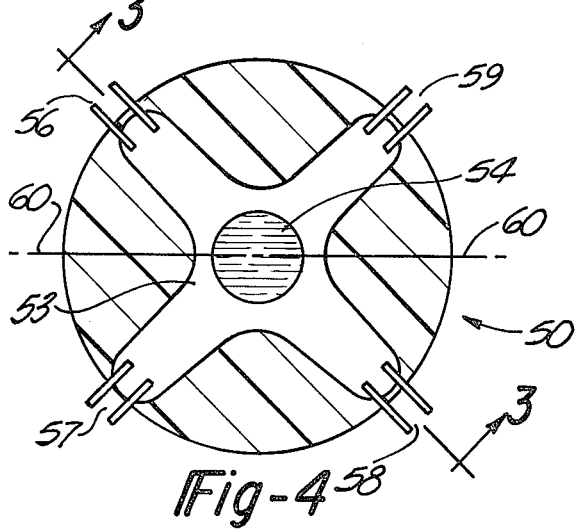
Fig-4
Fig-3
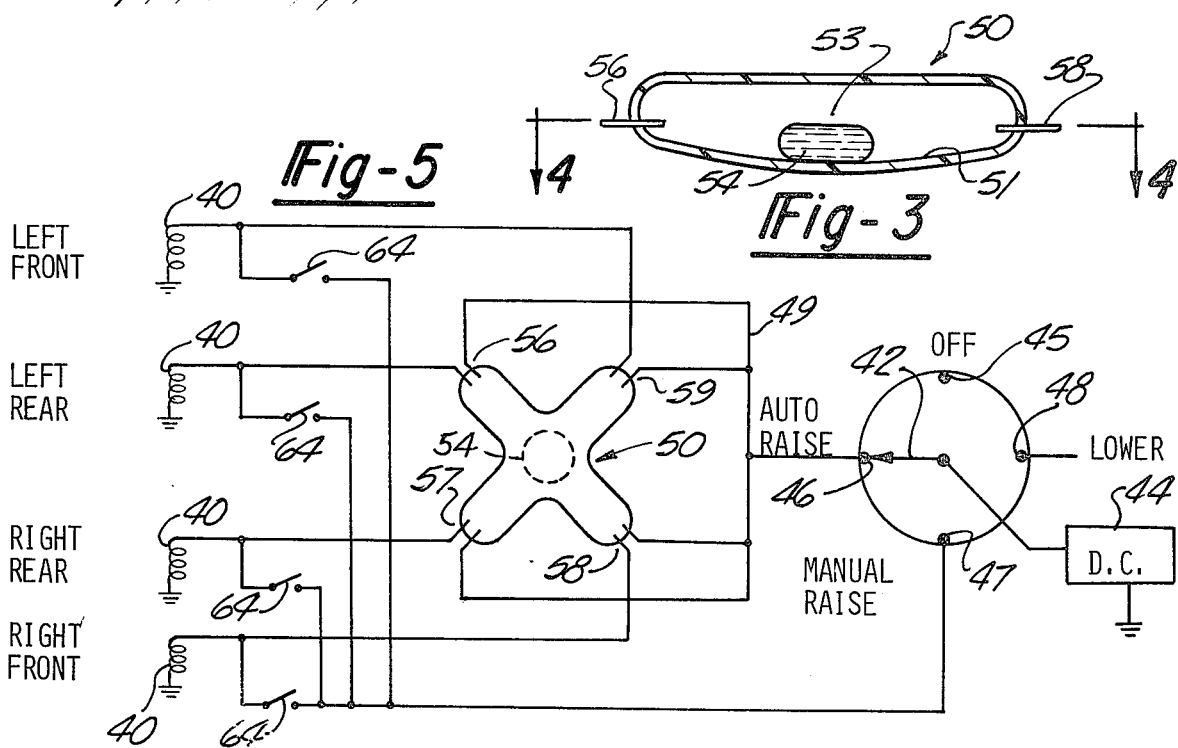
Fig-5

VEHICLE LEVEL CONTROL

The invention described herein may be manufactured, used and licensed by or for the Government for governmental purposes without payment to me of any royalty thereon.

BACKGROUND AND SUMMARY OF THE INVENTION OF THE INVENTION

Proposals have been made for locating missile launchers on flat bed trailers. As occassion might require, the trailer carrying the missile launcher would be moved on the highway and then overland to a selected off-road site. The trailer would then be anchored and supported, preferably in a substantially level attitude for proper positionment of the missile launcher.

The present invention proposes mechanism for effecting a levelling and anchoring operation on a mobile missile launcher platform or other vehicle; an aim of the mechanism is to effect the operation in a minimum time period, even when the vehicle is located on uneven or sloping terrain. The mechanism can include tilt-responsive switch structure operatively connected to vehicle-raising jacks located at the four corners of the vehicle. The jacks at the lowest corners are energized by the switch structure to raise the associated corner areas until the vehicle assumes a level attitude.

RELATED PATENT APPLICATION

This application is related to an application filed concurrently herewith in the name of Edward H. Czajkowski, Jr. entitled "Vehicle Level Control", now Ser. No. 499,375.

THE DRAWINGS

FIG. 1 is a side elevational view of a trailer suitable for use of the invention.

FIG. 2 is an elevational view of a jack structure used on the FIG. 1 trailer.

FIGS. 3 and 4 are sectional views taken through a tilt-responsive switch useful in practicing the invention.

FIG. 5 schematically illustrates an electrical control circuit incorporating the Fig. 3 switch.

FIGURES 1 AND 2

FIG. 1 shows a flat bed trailer 10 having front wheels 12 and rear wheels 14 for rollably supporting same during movement on and off the highway. A tractor, not shown, would be coupled to the trailer for towing purposes. At a selected site the tractor would be uncoupled from the trailer. Jacks 16 carried by the trailer at its four corners would then be energized to elevate and anchor the trailer in a stable level attitude. FIG. 1 schematically shows two jacks 16, one at the trailer front and one at the trailer rear. Two other jacks, not visible in FIG. 1, would be located in line with the illustrated jacks. Thus, four jacks are contemplated, one at each corner of the vehicle. The vehicle may be used to support a missile launcher, designated by numeral 17, or other structure, not shown.

FIG. 2 illustrates the general features of an illustrative jack structure. Any remotely controllable jack structure that is susceptible to being attached to the vehicle is suitable. As shown in FIG. 2 the jack comprises two parallel links 20 and 22 pivotally attached to the vehicle at 24 and 26, and a leg structure 28 pivotally attached to the links, as at 30 and 32. The lower end of the leg structure is pivotally joined at 29 to a foot pad 34.

The jack structure may be powered between its FIG. 2 full line "use" position and the dashed line "storage" position by a variable length power means trained between pivots 32 and 24. The power means comprises an electric motor 36 and ball screw 38. The "not" portion of the ball screw comprises an internally threaded sleeve 38 attached to pivot 32. The "screw" portion of the ball screw comprises a threaded shaft formed as an extension of the output shaft of motor 36; the threaded shaft extends into sleeve 38 so that energization of motor 36 produces translational motion of the sleeve on the threaded shaft. Motor 36 is connected to pivot 24 by suitable lug means, not visible in the drawing.

In the dashed line "storage" position of the jack structure pivots 24 and 32 are widely spaced. Motor 36 can be energized to draw pivot 32 toward pivot 24, thereby causing the links 20, 22 and leg structure 28 to uncork to the full line position. It is intended that the jack structures will carry the vehicle weight; i.e. the jack structure will sufficiently raise the trailer bed to transfer the sprung weight from the road wheels to the jack structures. The road wheels will continue to engage the ground surface, but the sprung weight will be borne by the jack structures; pads 34 will thus "anchor" the vehicle against inadvertant rolling movements.

During the latter stages of the vehicle raising operation each leg structure 28 will pivot inwardly about pivotal connection 29; i.e. leg 28 and links 20, 22 will tend to straighten out toward a straight-line relation, thereby raising pivot point 26 and hence the bed of the trailer. The trailer will move directly up without side sway or lateral displacement.

As previously noted, FIG. 2 is merely illustrative of one powered jack structure usable in practice of the invention. The jack power means can be electrical, hydraulic or pneumatic. In the case of electrical powering each of the four jack motors 36 can be energized in the raise mode through a conventional relay. In the case of hydraulic or pneumatic powering (fluid cylinders) each of the four power means can be controlled in the raise mode by means of a conventional solenoid valve located in the fluid power supply. In FIG. 5 the coils of the four raise-mode relays or valves are designated by numeral 40. The lower-mode coils are not shown in FIG. 5.

The FIG. 5 control means includes a manually actuated selector switch 42 arranged to transmit D.C. electrical power from electric source 44 to a selected one of contacts 45, 46, 47, or 48. In the "auto raise" position of switch 42 power is delivered to a line 49 that is common to one of two contacts located at each extremity of tilt-responsive switch 50. The switch chamber 53 is of cruciform shape, thereby forming four chamber extremities which locate four sets of spaced contacts 56, 57, 58, and 59. The floor 51 of chamber 53 is sloped downwardly from the extremities to the central area of the chamber; accordingly when the switch chamber has a level attitude the mass of liquid mercury 54 gravitates to a central position in the chamber, as shown. Switch 50 is mounted on the vehicle so that contacts 56, 57, 58 and 59 are at the same level when the vehicle is in a level condition, i.e. mercury globule 54 is in the central area of the chamber.

Switch 50 is oriented on the vehicle so that contacts 58 and 59 are disposed toward the front of the vehicle, while contacts 56 and 57 are disposed toward the rear of the vehicle. Assuming that imaginary line 60 represents the front-to-rear direction taken by trailer 10 (normal to the road wheel axles), then contacts 58 would be in a right-forward location, contacts 59 would be in a left-forward location, contacts 56 would be in a left-rearward location, and contacts 57 would be in a right-rearward location. The coil 40 locations (FIG. 5) correspond to the locations of the jacks on the vehicle.

In operation of the system, the four jacks can be moved from the storage positions (dashed lines in FIG. 2) to the "use" positions by setting switch 42 to the "manual-raise" position, and then closing manual switches 64.

With vehicle weight transferred to the jack structures switch 42 can be moved to the "auto raise" engaged with terminal 46, thereby permitting a vehicle levelling operation.

Liquid globule 54 will gravitate toward the lowest set of contacts, thereby allowing such contacts to energize the associated jack energizer coil 40. As the particular jack raises the lowermost corner of the vehicle to approximately the same level as the other corners of the vehicle, globule 54 will gravitate to a central location thereby deenergizing the jack motor. The operation of raising one corner of the vehicle may result in a relative lowering of an adjacent corner, in which case the liquid globule would gravitate from the central area of the chamber toward the particular set of contacts corresponding to the lowered corner, thereby causing the respective jack to raise that corner.

When it becomes necessary to move the vehicle to a new location switch 42 is moved to engage terminal 48. Coils similar to coils 40 connect with terminal 48 to energize motors 36 or their equivalent in the reverse direction, i.e. the direction that would allow the sprung vehicle weight to be transferred onto road wheels 12 and 14, and would thereafter move jacks 16 to the storage positions.

In the "use" positions the jacks are required to bear the entire sprung vehicle weight. Therefore each motor 36 is preferably equipped with a brake mechanism for automatically preventing the motor output shaft from rotating when the motor is de-energized. Such a brake also holds the jack against inadvertant "uncorking" when it is in the storage position (dashed lines FIG. 2).

Preferably each motor 36 is controlled by different set of contacts (56, 57, 58 or 59) to provide levelling in two directions, i.e. front-to-rear and side-to-side. If it is deemed sufficient to provide automatic levelling in only one direction, e.g. front-to-rear, then a modified tilt-responsive switch having only two sets of contacts would be used; the contacts would be oriented in a front-rear relation. In that event the two front motors 36 would be energized by the front set of contacts and the two rear motors 36 would be energized by the rear set of contacts. Supplementary side-to-side levelling could be provided by manual switches 64 or a second tilt-responsive switch extending in a side-to-side direction

I Claim:

1. In a four cornered vehicle having right and left front wheels, and right and right and left rear wheels for overland transport of the vehicle: the improvement comprising means for anchoring and supporting the vehicle in a substantially level attitude on uneven or sloping terrain; said means comprising a jack means carried by the vehicle at each of its four corners, and electrical control means responsive to a tilted condition of the vehicle to selectively actuate the jack means for causing the vehicle to assume a substantially level attitude; said electrical control means comprising a miniature cruciform chamber which includes a central chamber area and four perimetrical chamber areas; said chamber being oriented on the vehicle so that a first perimetrical area is disposed in a left-forward location relative to the central area, a second perimetrical area is disposed in a right-forward location relative to the central area, a third perimetrical area is disposed in a left-rear-ward location relative to the central area, and a fourth perimetrical area is disposed in a right-rearward location relative to the central area; first, second, third and fourth sets of spaced contacts in respective ones of the perimetrical areas; the central area of the chamber comprising a floor that is at a lower elevation than the spaced contacts when the vehicle assumes a level attitude; and an electrically conductive liquid only partially occupying the chamber so that when the vehicle is in a level condition none of the contact sets is immersed in the liquid; the amount of liquid being sufficient that when the vehicle is tilted in any given direction the liquid gravitates in the chamber to bridge the set of contacts then in a lowered condition due to the vehicle-tilt action.

* * * * *